Feb. 6, 1934.                G. E. ROWE                1,945,982
                  MANUFACTURE OF HOLLOW GLASSWARE
                    Filed July 8, 1932      3 Sheets-Sheet 1
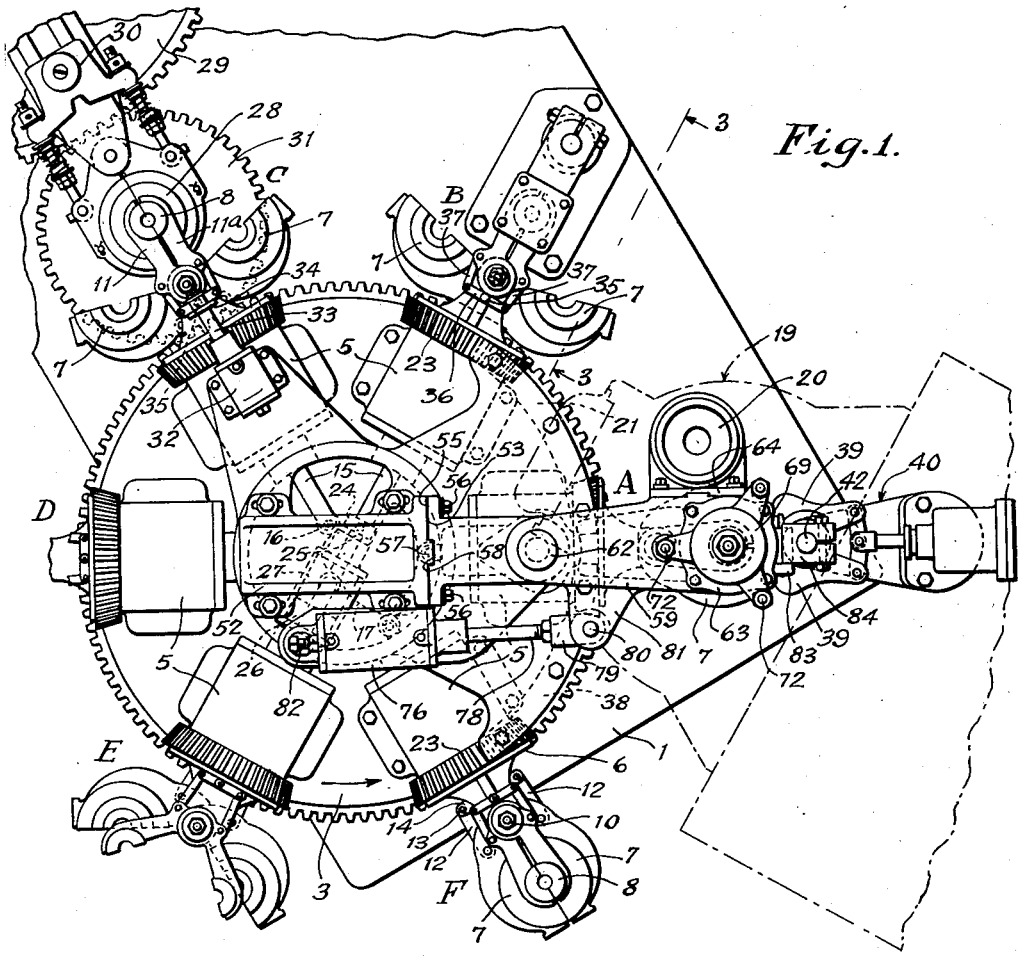
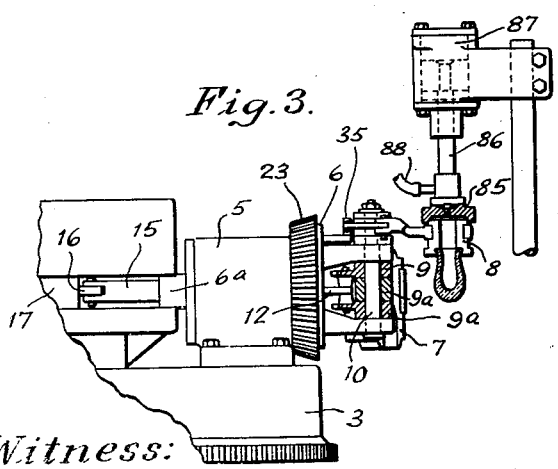
Inventor
George E. Rowe
by Brown & Parlaw
Attorneys.

Feb. 6, 1934.  G. E. ROWE  1,945,982

MANUFACTURE OF HOLLOW GLASSWARE

Filed July 8, 1932  3 Sheets-Sheet 2

Witness:
A. A. Horn

Inventor
George E. Rowe
by Burun & Laur
Attorneys.

Feb. 6, 1934.  G. E. ROWE  1,945,982
MANUFACTURE OF HOLLOW GLASSWARE
Filed July 8, 1932   3 Sheets-Sheet 3

Witness:
A. A. Horn.

Inventor
George E. Rowe
by Bumn & Parlaw
Attorneys.

Patented Feb. 6, 1934

1,945,982

UNITED STATES PATENT OFFICE 1,945,982

MANUFACTURE OF HOLLOW GLASSWARE

George E. Rowe, Wethersfield, Conn., assignor to Hartford-Empire Company, Hartford, Conn., a corporation of Delaware Application July 8, 1932. Serial No. 621,350

3 Claims. (Cl. 49—9)

This invention relates generally to the manufacture of hollow glassware according to that method which contemplates the formation of each of such articles from a charge of glass of insufficient mass completely to fill the glass shaping cavity of the first mold to which glass for the article is delivered. The manufacture of an article of hollow glassware by this general method may be effected by blowing fluid under pressure into the glass, by pressing the glass, or by a combination of pressing and blowing operations. The articles formed may vary widely in configuration, size and utility, and may be substantially straight-sided or of either the so-called wide-mouthed or narrow neck type.

A general object of the invention is to provide a novel method of and improved means for producing an open-ended cavity in a mass of molten glass in a receptacle, such as a glass charge in a mold, by applying fluid under pressure locally to a portion only of an end surface of the glass in the receptacle so as to cause glass of the mass to be displaced in the direction opposite that in which the fluid under pressure is applied.

An object of the invention is to improve the manufacture of articles of hollow glassware by providing a novel method of and means for forming an axial cavity in the glass charge in the first glass shaping mold and for causing contact of the surface of glass of the charge in the cavity of the mold at all points throughout the length of the mold cavity.

A further object of the invention is to improve the manufacture of blown glassware by providing a novel method of acting on the glass after it has been received in a parison mold and on the partially expanded parison in the final blow mold so that the walls of the finally blown article will have a substantially uniform thickness throughout and will be practically free from "blow" waves and like defects.

A further object of the invention is to produce an axial cavity in the end portion of the glass charge in a parison mold opposite that through which blowing pressure will subsequently be introduced into the glass, by applying air under pressure locally to the central portion of the first-named end of the glass charge in the parison mold so as to displace glass of such charge in the direction opposite that in which the air under pressure is directed, whereby to cause contact of glass of the charge with the side walls of the shaping cavity of the parison mold throughout substantially the entire area of such walls without requiring the use of a glass displacing plunger or like implement.

Other objects and advantages of the present invention will become apparent from a consideration of the accompanying drawings, and of the hereinafter given specification relating thereto.

In the manufacture of blown glassware by that method in which a hollow parison is first formed in a parison mold and later transferred to and blown to final form in a finishing mold, it is usual to "settle" the glass of the charge in the parison mold by air pressure applied over the entire surface of the end of the glass in the parison mold opposite to that into which blowing pressure subsequently will be introduced.

My improved method is distinguished from this well-known "settle blowing" or "compacting" of a glass charge in a parison mold particularly in that the air under pressure according to the present invention is applied locally to the hotter and more fluid central portion of the glass charge in the parison mold, and thus tends to cause displacement of only hotter glass of such central portion of the mass without causing displacement of the surface glass of the charge in contact with the side walls of the cavity of the parison mold.

Furthermore, according to the improved method, the application of air under pressure locally to an end surface of the hotter central portion of the glass charge in the parison mold is attended by displacement in the reverse direction of glass of the charge as required to produce surface contact of glass of the charge with the walls of the shaping cavity of the parison mold throughout the entire area of such walls. The method of the present invention therefore may be used not only to effect the result for which "settle blowing" heretofore has been employed, but also to effect the more important result of producing contact of glass of the charge with the walls of the shaping cavity of the mold throughout substantially the entire area of such walls without the necessity of a "counter-blowing" or glass pressing operation for that purpose, as heretofore has been usual, and without the usual so-called "counter-blow or press waves" in the glass parison.

The present invention may be carried into effect by presenting a parison mold in inverted position, with the neck portion thereof downward, at a station at which a suitable charge of molten glass is delivered thereto through a funnel or in any other suitable manner. This charge, as hereinbefore pointed out, is of insufficient mass completely to fill the glass shaping cavity of the inverted parison mold.

This settling of glass of the charge, so that the lower portion thereof completely fills the available space about a neck pin in the neck portion of the parison mold, may be aided by the operation of the improved method, or may be effected before the performance of the steps of the improved method, either by gravity or partially by gravity and partially by the application of suction to the glass in the neck finish portion of the mold.

With the glass charge in the glass shaping cavity of the inverted parison mold, a combined mold closure and pressure fluid applying member or nozzle may be lowered to position to dispose the extremity of such member close to or in contact with the surface of the central portion of the glass charge in the mold cavity while the body of the member closes the glass shaping cavity of the parison mold at the upper end of the latter. This will leave a space in the mold cavity between the depending extremity of the pressure applying member and the adjacent walls of such cavity. Pressure fluid, such as air under pressure, may be applied through the aforesaid member locally to the glass at the center of the mold, and may force some glass of the hotter central portion of the charge downwardly, thereby aiding in filling the neck portion of the mold if the latter has not already been completely filled.

The major displacement of glass as a result of the application of the air pressure locally to the upper surface of the central portion of the charge will be in an upward direction. The upwardly displaced glass will be forced into contact at its surface with the walls of the previously unfilled end portion of the shaping cavity of the mold and also will constitute walls of an open-ended axial cavity in the glass in the mold cavity.

The combined mold closure and pressure applying member may now be removed and air pressure may be introduced into the glass at the opposite end of the parison mold to produce a "bubble" or internal space in the glass parison. The mold may be reverted before or after the production of the "bubble" or internal space in the glass therein. The blowing of the "bubble" in the glass parison may be effected in a closed parison mold, in which event the size of such bubble will have been predetermined by the size of the axial cavity in the opposite end of the glass in the parison mold, or the "bubble" may be blown in the glass after the body of the parison mold has been opened to leave the glass of the parison suspended from or supported by the neck portion of such mold.

After the formation of the hollow parison, such parison may be transferred to a finishing mold and blown therein to final form.

The invention in its more general aspects may be employed to form an open-ended cavity in a body of molten glass in a mold or like receptacle by the application of air under pressure locally to a portion only of an end surface of the glass body so as to displace glass of the body in the direction opposite to that in which the air pressure is directed, irrespective of the further steps which may be employed to fabricate such glass body into an article of glassware.

In the drawings:

Figure 1 is a partial plan view of apparatus adapted for use in carrying out the method of the invention and embodying certain structural features of the invention;

Figure 2:
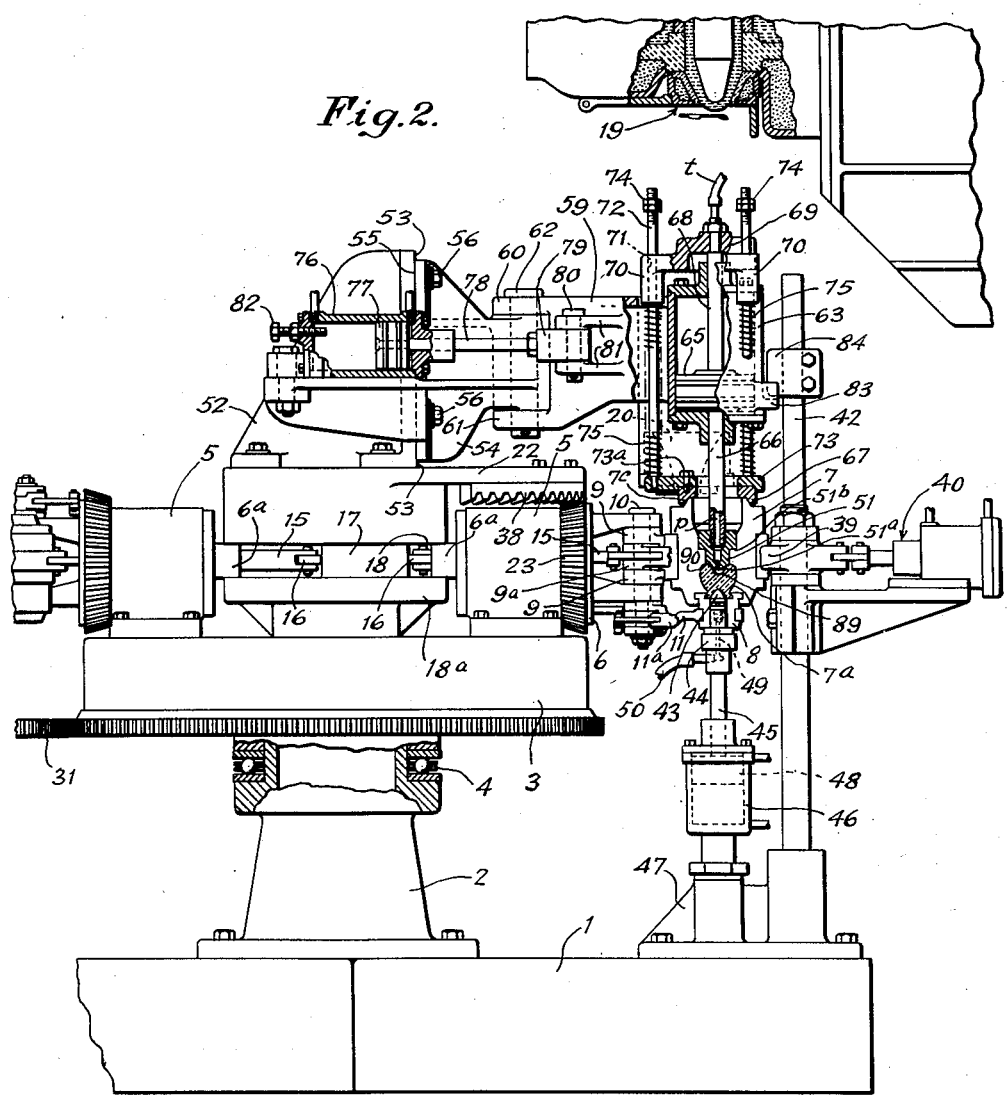
Fig. 2 is a fragmentary side elevation of a portion of the machine shown in Fig. 1, parts of such machine being shown in section and other parts thereof being omitted to permit a view of parts which otherwise would be hidden.
Figures 10, 11:
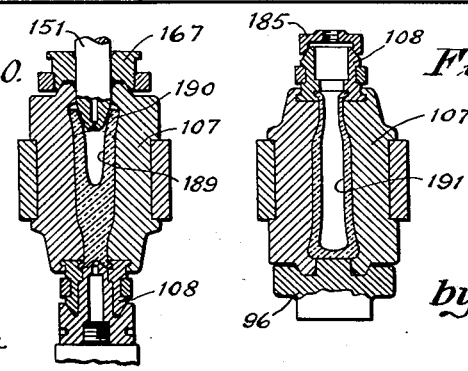
Figure 4:
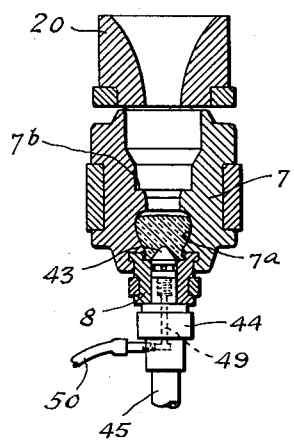
Figure 5:
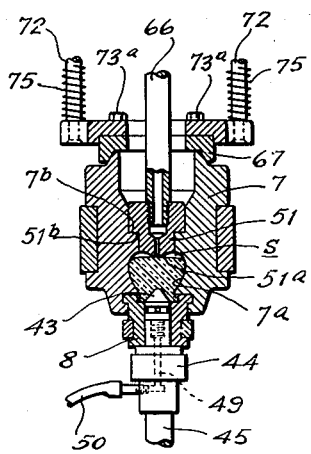
Figure 6:
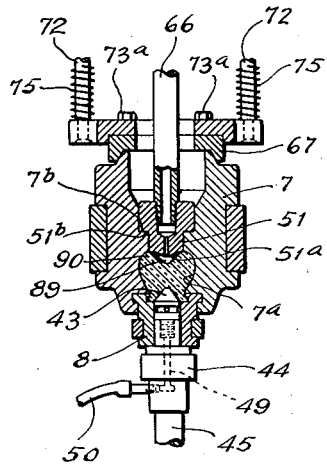
Figure 7:
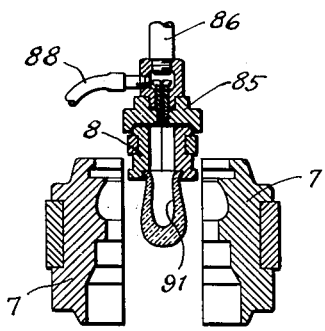

Fig. 3 is a fragmentary view mainly in side elevation and partly in vertical section, showing a portion of the machine of Figs. 1 and 2 as viewed from the line indicated at 3—3 of Fig. 1, the view illustrating the parison mold of the machine at the station at which air pressure may be applied for the preliminary blowing or formation of a bubble in the glass parison, the latter being suspended from the neck ring of the parison mold and the halves of the body of the parison mold being open;

Figs. 4 to 9 inclusive are fragmentary vertical sectional views, illustrating certain steps in the applicants novel method in the formation of a bottle from a charge of molten glass in successively used parison and finishing molds, such molds and certain associate parts of the structure for use in carrying out the method being shown in vertical section; and Figs. 10 and 11 are views corresponding generally with Figs. 6 and 7, but illustrating certain steps of a method of the invention as modified for the formation of a hollow parison in a closed parison mold.

Referring now particularly to Figs. 1 to 3, inclusive, apparatus for use in carrying out the invention may comprise a base 1, on which is mounted a pedestal or column 2 for supporting a rotary parison mold table or carrier 3. The table 3 is shown as being mounted anti-frictionally, as at 4, Fig. 2, on the column or pedestal 2, for rotation about the axis of the latter.

A plurality of radial bearings 5, spaced angularly about the center or axis of rotation of the table 3, are secured on the latter. In the embodiment of the invention illustrated in the drawings, six of these bearings 5 are provided and each provides a journal for the body of a carrier 6 of a parison mold unit. Each parison mold preferably comprises a longitudinally split body portion 7 and the cooperative longitudinally split neck portion 8. The halves of the body portion 7 of the parison mold are provided with suitable arms, as at 9, 9a, connected with the carrier 6 by means of the vertical pivot pin 10. The halves of the neck portion of the parison mold likewise may be provided with suitable arms, as at 11, 11a also connected with the carrier 6 by the pivot pin 10, whereby the halves of both the body portion and the neck portion of the parison mold may be swung about the axis of the pivot pin 10 between open and closed positions.

The table 3 may be rotated in any suitable known manner so that each of the parison molds will be moved in turn as the table rotates to each of the stations, indicated at A, B, C, D, E and F in Fig. 1, and may be halted temporarily at each of such stations.

The opening and closing of each parison mold at the proper times during a cycle of rotation of the table 3 may be effected in any suitable known manner. The particular embodiment of the invention shown in Figs. 1 to 3, inclusive, has the arms 9, 9a of the sections of the body of the parison mold suitably connected, as by the links 12 and suitable pivot elements 13, with a cross head 14 at the outer end of a radially slidable rod 15 that extends through the associate bearing 5. The rod 15 is provided at its inner end with a roller 16 adapted to contact with a stationary cam track 17, Fig. 2, during part of the rotation of the parison mold table. The rod 15 extends slidably through a squared guide 6a, connected with or comprising a part of the carrier 6. Such guide engages with the vertically spaced stationary horizontal guide members 18, 18a so as to prevent turning of the carrier 6 and its supported mold about the axis of its bearing 5 except at the two places hereinafter indicated in the cycle of rotation of the parison mold table.

Each parison is in inverted position when at station A, which is the mold loading station, and which is so located that a charge of molten glass from the outlet of the glass feeding mechanism, generally indicated at 19, in Figs. 1 and 2, may drop downwardly into the upper end of the inverted closed parison mold when the latter is at station A. The feeder may be of any suitable construction, adapted to deliver separated preformed charges of glass to the parison mold, such feeder preferably being of the type known as the Hartford single feeder, a disclosure of which may be found in Patent No. 1,760,254, granted to Karl E. Peiler, May 27, 1930.

A funnel 20 may be supported by means to be hereinafter described for movement between the position shown in Fig. 1 and a position in line with the parison mold at station A, as shown in Fig. 4, for guiding a charge from the feeder into the mold.

After the charged mold has been moved by the rotation of the table 3 from the station A, an arcuate gear segment or rack 21 on a stationary support 22, above the mold table, will be engaged by a bevel gear 23 on the parison mold carrier and will revert the mold by the time such mold reaches station B. The movement of the mold carrier to bring the charged mold to the station B will cause an upstanding pin at the inner end of the roller supporting rod 15 of the mold opening and closing mechanism to be engaged by a hook 24 on the stem 25 of a piston 26 that is reciprocable in a cylinder 27 on the mold table supporting structure. At the proper time, fluid pressure is admitted to the outer end of the cylinder 27 to cause the piston 26 to move rearwardly in the cylinder toward the position shown in Fig. 1, thus pulling the rod 15 toward the cylinder 27 and opening the halves of the body of the parison mold, as shown for the mold at station B in Fig. 1. The neck portion of the parison mold remains closed until the halves 28 of a finishing mold on a finishing mold table 29 have been actuated by suitable mechanism, such as partially shown at 30, in Fig. 1, so as to close about the suspended parison at the station C. The halves of the neck portion of such parison mold then will be opened to release the parison so that it may be supported thereafter entirely by the finishing mold and carried by the latter with the rotating table 29. The table 29 and the table 3 are connected to rotate in synchronism with each other, as by means of an intermediate gear 31 which has teeth in mesh with peripheral teeth on each of the two tables.

The opening of the halves of the neck portion of the parison mold may be effected at the station C by mechanism which includes a cylinder 32, mounted on a stationary portion of the structure above the parison mold table. A piston within the cylinder 32 has a rod 33 provided with a grooved portion or spool 34, Fig. 1, for engaging with a pin or upstanding lug 35 on a cross head 36, that is connected by the links 37 and suitable pivot elements, with the arms of the halves of the neck portion of the parison mold. Air is admitted at the proper time to the outer end of the cylinder 32, thereby causing the piston within such cylinder to be moved radially inward. The pivoted arms that carry the halves of the neck ring portion of the parison mold thus are actuated to open the neck portion of the parison mold. It may be noted that the contour of the cam 17 is suitable to permit the parison mold body and neck portions to be opened at the proper times and to remain open as such mold is moved by the rotation of the table 3 past the stations D and E. After the mold passes the station E, the engagement of the roller 16 at the inner end of the rod 15 of the mold opening and closing mechanism with the cam 17 will cause closing of the halves of the parison mold. As the halves of the body of the parison mold close, they will engage with the halves of the neck portion of such mold so as to close the latter, also. Thus, the parison mold will be closed at station F, Fig. 1. Spring means (not shown) may be associated with the rod 15 to maintain the mold halves closed until positively opened by the mechanism above described or other suitable mechanism.

After leaving station F, the bevel gear 23 on the carrier for the parison mold will engage with an arcuate rack or gear segment 38 so as to invert the mold by the time the latter reaches station A, beneath the outlet of the feeder 19. The halves of the body of each parison mold may be kept tightly closed at the station A by pneumatically operated pivoted clamping jaws 39 of clamping mechanism generally indicated at 40 and supported, as on the standard 42, adjacent to the station A.

This mold clamping device, as well as the particularly indicated parison and finishing mold table supporting and operating mechanisms, including the means for inverting and reverting the parison molds and for opening and closing the sections of the body and neck portions of each parison mold, and for effecting the transfer of the parison to the finishing mold at the station C, may differ from generally similar parts of the well-known Lynch glassware forming machine, a disclosure of which may be found in Patent No. 1,766,135, granted June 24, 1930 to James W. Lynch, only in features which have been or hereinafter will be particularly pointed out.

When the inverted parison mold is at the station A, the neck pin 43 may be projected upwardly into the neck portion of such mold. The lower portion of the bore of the neck portion of the parison mold may be closed by a portion of the neck pin which may be carried by a head 44. The latter is carried by a piston rod 45. The piston rod 45 projects upwardly from a cylinder 46 that is mounted, preferably adjustably, on a bracket 47 beneath the mold loading station A. When air pressure is admitted to the lower part of the cylinder 46, the piston 48 in the latter will be raised, thereby lifting the neck pin to its raised or operative position as shown in Figs. 2 and 4 to 6 inclusive. The neck pin may be provided with a suitable internal passage, such as indicated at 49, in Figs. 2 and 4 to 6, inclusive, for applying sub-atmospheric pressure around the tip of the neck pin in the cavity of the neck portion of the parison mold. Such sub-atmospheric pressure may be obtained by connecting the passage 49 with any suitable source of sub-atmospheric pressure or suction, in any suitable known manner, as through the intermediacy of a flexible tube 50 and other well-known parts (not shown).

The funnel 20 and a combined bottom plate or closure and fluid pressure applying nozzle 51 are moved successively to and from position in alignment with the inverted parison mold at the upper end of the latter when such parison mold is at the station A.

The mechanism for supporting and moving the funnel and the member 51 to and from position in alignment with the inverted mold will now be described.

Such mechanism comprises a supporting bracket 52, Figs. 1 and 2, on the frame structure above the parison table. The bracket 52 is formed with a vertical face 53 that is turned toward the charging station A. A vertically adjustable bracket 54 has a vertical face 55 in sliding contact with the face 53 of the bracket 52 and held against the latter in vertically adjusted position by means of the fastening devices 56. In order to prevent lateral displacement of the bracket 54 as it is adjusted vertically on the bracket 52, the latter may be provided with a rib 57 which fits slidably in a vertical groove 58 in the face 55 of the bracket 54, Fig. 1.

An arm 59 is mounted on the outer end of the bracket 54 for oscillation horizontally, such arm being connected at its inner end with the bracket 54 by suitable vertically spaced ears 60, 61, and a vertical pivot pin 62. The oscillatory arm 59 has its outer end portion integral or connected with a vertical cylinder 63. A lateral bracket 64 at one side of the outer portion of the arm 59 supports the funnel 20. A piston 65 that is reciprocable in the cylinder 63, has a downwardly extending stem 66 secured at its lower end to the aforesaid member 51. The member 51 is movable by the piston 63 and piston rod 66 vertically to and from an operative position within the upper end portion of the inverted parison mold at the station A, as shown in Figs. 2, 5 and 6.

The piston 63 also has an upwardly extending stem 68 which protrudes from the top or upper head of the cylinder 63 and is connected at its upper end with a lifter head 69. The latter may have the form of a spider wheel, the arms thereof being provided with downwardly enlarged bosses 70 formed with vertical openings 71 through which rods 72 extend slidably. The lower ends of the rods 72 are secured to outwardly extending lugs on a horizontally disposed connector ring 73. As shown in Figs. 2, 5 and 6, the connector ring is secured by screws or other suitable fastening devices 73a to a centering and stabilizing ring 67. The ring 67 has a depending flange formed with a downwardly enlarging beveled inner wall adapted to closely fit and engage a correspondingly configured upstanding central portion 7c of the inverted parison mold body. The upper end portions of the rod 72, above the bosses 70, are provided with adjustable stop members, such as the nuts 74. Expansion springs 75 encircle the rods 72 between the bosses 70 and the ring 73 and tend to force the ring 73 and the centering ring 67 downward. The arrangement is such that when the piston 65 moves upward from the position shown in Fig. 2, the member 51 will be raised independently of the rings 73—67 until the bosses on the arms of the head 69 strike the limit stops 74 on the rods 72. Thereafter, upward movement of the piston 65 will cause upward movement also of the rings 73—67 and rods 72. The member 51 and the rings 73—67 thus may be raised as a unit above the inverted parison mold.

On the return or downward movement of the piston 65, the member 51 and the raised centering ring 67 will move downward as a unit until the latter rests upon and engages an inverted parison mold at the charging station A and then the further downward movement of the piston 65 will cause independent downward movement of the member 51 centrally in the bore of the inverted parison mold to operative position at the upper end of the cavity 7a for a purpose which will be hereinafter more fully explained.

It, of course, is to be understood that the vertical movements of the member 51 and of the centering ring by the means above described will be effected only when such parts are in vertical alignment with the inverted parison mold at the station A. Oscillation in a horizontal plane of the arm 59 permits the funnel 20 to be disposed above the inverted parison mold at the station A for guiding into the latter a charge of glass delivered from the outlet of the feeder 19. At this time, the member 51, the centering ring 67 and the operating parts directly thereabove are disposed laterally out of line with the parison mold at the station A. After the charge has been delivered to the parison mold through the funnel 20, the arm 59 is oscillated to swing the funnel 20 laterally to one side, as shown in Fig. 1, and to bring the member 51 and the centering ring and other operating parts above the inverted charged parison mold.

This oscillation of the arm 59 in a horizontal plane may be effected by mechanism which comprises a cylinder 76 on the bracket 54, a piston 77 reciprocable in the cylinder 76, a piston rod 78 movable with the piston 77, and a link 79 operable by the piston rod 78 and pivotally connected by the pin 80 with a laterally projecting lug 81 on the oscillatory arm 59. Pressure fluid may be admitted to and exhausted from opposite ends of the cylinder 76 to reciprocate the piston 77 and for swinging the funnel 20 and the member 51 and its associate parts to and from position in alignment with the inverted parison mold at the station A at the proper times. Any suitable known means may be employed for controlling the admission of pressure fluid to the cylinder 76 and the exhaust thereof.

An adjustable stop screw 82 may be provided at one end of the cylinder 76 to limit the movement of the piston 77 in one direction of the cylinder so that correct alignment of the funnel with the inverted parison mold at the station A will be assured when the arm 59 is oscillated in a clockwise direction from the position shown in Figs. 1 and 2. A stop lug 83 on the cylinder 63 will contact with a stop member 84 on the standard 42 to limit return oscillatory movement of the arm 59 as the piston 77 moves to the position shown in Fig. 2, thereby assuring accurate alignment of the ring 67 and the member 51 with the inverted parison mold at the station A when the arm 59 has been moved to the position shown in Figs. 1 and 2. The engagement of the ring 67 with the upstanding upper end portion of the parison mold will positively maintain the centered or axial alignment of the member 51 with the bore of the inverted parison mold.

The extremity or nose of the member 51 preferably has a convexly curved or tapered surface, such as indicated at 51a in Figs. 2, 5 and 6. The body of the member 51 is adapted to serve as a closure for the upper end of the glass receiving cavity 7a of the body of the inverted parison mold.

The cavity 7a of the particular parison mold shown in Figs. 1, 2 and 4 to 7 inclusive extends for only part of the length of the parison mold body. The portion of the bore of such parison mold above the cavity 7a is adapted to receive the body of the member 51 when the parison mold is in inverted position at the station A and the member 51 has been projected downwardly to its operative position, as shown. At this time, a downwardly facing shoulder 51b on the body of the member 51 may be seated on an upwardly facing shoulder 7b on the inner wall of the bore of the inverted parison mold body above the cavity 7a. The arrangement is such that when the lowermost or central portion of the extremity of the member 51 is close to or in contact with the surface of the central portion of the charge in the cavity 7a, a space s, Fig. 5, will remain between the remainder of the surface of the glass charge and the top of the closed cavity 7a. It is preferred that the portion of the bore of the inverted parison mold body at the upper end of the cavity 7a shall be of less diameter than the immediately adjacent portion of the cavity 7a so that the joint between the body of the member 51 and the wall of the cavity 7a will be located within a circle tangent to the periphery of the adjacent portion of the glass charge in the cavity 7a. This tends to obviate the production of a seam at the edge of the upper portion of the inverted glass parison when glass of the charge is forced upwardly as a result of blowing pressure applied through the member 51.

An axial fluid pressure conducting passage p extends through the member 51, stem 66, piston 65 and upper stem 68, and may be connected in any suitable known manner, as by the flexible tube t with any suitable source of pressure fluid supply (not shown).

A blow head 85, Fig. 3, is adjustable vertically by the stem 86 of a piston in the cylinder 87 above the reverted or upright neck ring when the latter is at the station B. This head 85 will be lowered to operative position at the upper end of the neck portion of the parison mold at the station B and for the admission of blowing pressure therethrough, as shown in Figs. 3 and 7. The blow head 85 may be operatively connected with a source of pressure fluid in any suitable known manner, and to this end may be provided with a flexible pressure fluid supply tube, such as indicated at 88.

A cycle of operations of the mechanism above described for use in the performance of the improved method of forming an article of hollow glassware may be substantially as follows:

The cycle of operations may be assumed to start with an empty inverted parison mold at the station A. At this time, the funnel 20 will be disposed in alignment with the inverted parison mold and in position to direct into the latter a charge of glass from the feeder 19. In Fig. 4, the funnel is shown above the parison mold and the latter is shown after it has been loaded or charged with glass. As the glass enters the inverted parison mold, suction may be applied through the neck pin head 44 and around the tip of the neck pin 43 to aid in drawing glass into the cavity between the neck pin and the neck portion of the parison mold to the neck finish portion of the article that is being made. The parison mold shown in Figs. 1 to 6, inclusive, is of the type that is adapted for the formation of relatively wide-mouthed bottles or ware.

After the parison mold has been loaded, as shown in Fig. 4, the arm 59 is oscillated to swing the funnel 20 to its out-of-the-way position, as shown in Fig. 1, and to bring the member 51 and the ring 67 to position above the parison mold, the latter still being at the station A. The member 51 and the ring 67 then are lowered to the positions shown in Figs. 2 and 5. Air under pressure is applied through the member 51 locally at the center of the surface of the upper portion of the glass in the parison mold, thereby forming a cavity, as indicated at 89, Figs. 2 and 6, in the glass in the body portion of the inverted parison mold. The formation of the cavity 89 is attended by upward displacement of glass of annular form, as indicated at 90 in Figs. 2 and 6, such displaced glass filling the space s. By suitable selection of the size of the space s, and regulation of the pressure applied through the member 51, the size of the subsequently formed central cavity 89 may be predetermined. This may approximate or be less than the size or capacity of the bubble to be subsequently produced in the parison, depending on whether or not such bubble is to be formed in glass in a closed mold or in glass suspended in air.

After forming the cavity 89, as shown in Figs. 2 and 6, the member 51 and the ring 67 are raised and the mold is moved by the rotation of the parison mold table 3 from the station A to the station B. It, of course, will be understood that the neck pin 43 is withdrawn downwardly from the neck finish portion of the glass in the parison mold while the latter is at the station A and before the intermittent rotary movement of the table 3 has commenced. The parison mold will be reverted during its movement to station B.

Reheating of the glass of the parison having the cavity 89 therein may take place during the movement of such parison in the closed parison mold from the station A to the station B. At station B, the halves of the body of the reverted parison mold are opened, leaving the parison suspended by its neck from the neck ring or portion of the parison mold. At station B, the blow head 85 will be lowered to position to cover the upper end of the glass suspending neck ring. Blowing pressure is applied by the head 85 through the neck ring and the neck portion of the glass parison to blow a bubble or produce an internal cavity in the latter, as indicated at 91 in Fig. 7. The production of the bubble or internal cavity 91 will be attended by elimination of the cavity 89 as hotter and more fluid glass at the center of the pendant parison body is forced downward and may also be attended by stretching and elongation of the body of the suspended parison under the influence of gravity and blowing pressure.

Figure 8:
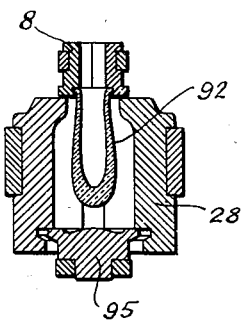
Figure 9:
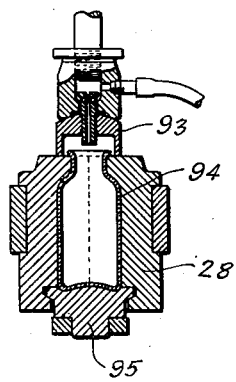

After blowing pressure of a predetermined volume and intensity has been applied by the head 85 to form a hollow parison of the size desired, the head 85 is removed and the parison mold table is rotated to move the hollow parison, still suspended from the neck ring 8, from station B to station C. This is the parison transfer station at which the halves of the finishing mold 28 will be closed about the suspended partially expanded parison, which may have elongated somewhat and may have a form substantially as indicated at 92 in Fig. 8. The halves of the neck portion of the parison mold then will be opened to release the parison when the halves of the finishing mold have completely closed (they are shown in Fig. 8 before they have completely closed), and the parison will be moved with the finishing mold as the finishing mold table 29 rotates. A final blow head 93 will be brought to operative position above the partially expanded parison in the final blow mold and blowing pressure will be applied therethrough to blow the parison to final shape, as shown at 94 in Fig. 9. It, of course, will be understood that a suitable bottom plate or baffle, such as indicated at 95 in Figs. 8 and 9, will be associated with the finishing mold halves.

The method of the invention also may be used in the production of articles of hollow glassware of the so-called narrow neck type and, as hereinbefore has been pointed out, may be used in the formation of a hollow glass parison in a closed parison mold. In Figs. 10 and 11, two steps of the method as modified for the production of a hollow parison for a narrow neck bottle in a closed parison mold are shown.

In Fig. 10, a combined mold cavity closure and pressure fluid applying member, designated 151, is shown in operative position with respect to a glass charge in a parison mold. The mold comprises the partible body portion 107 and the partible neck ring or neck portion 108. The parison mold shown is adapted for the formation of a parison for a narrow neck bottle and the member 151 has an elongated tapering extremity which depends into the upper end portion of the cavity of the inverted parison mold a distance sufficient to leave room for a substantial quantity of glass between the depending extremity of the member 151 and the adjacent side walls of the mold cavity. The member 151 may be surrounded by a centering or stabilizing ring 167.

When air under pressure has been applied through the member 151 locally to the surface of the glass at the center of the charge in the inverted parison mold an axial cavity, substantially as indicated at 189, will be formed therein and glass of the charge will be displaced upwardly at 190 nearly to the top of the annular space between the depending extremity of the member 151 and the adjacent side walls of the mold cavity.

In the formation of the cavity 189 in the glass in the mold 107 by mechanism substantially as hereinbefore described, the opening of the halves of the body of the parison mold may be postponed until after the parison mold has moved past the station B of Fig. 1. The parison mold may be reverted during its movement from station A to station B, as hereinbefore described, and at station B, a blow head 185 may be applied to the neck ring portion of the reverted closed parison mold to blow a bubble 191 in the glass in such mold, substantially as shown in Fig. 11. The size or capacity of the bubble or hollow interior of the glass parison will have been predetermined by the size of the axial cavity 189, which in turn was predetermined by the volume and intensity of the pressure appied through the member 151 and the space available for upward displacement of the glass annulus 190 of Fig. 10.

In the formation or blowing of the bubble 191 in the glass in the closed reverted parison mold, a bottom plate or baffle, such as indicated at 96, may be applied to the bottom of the body of the parison mold.

Glassware forming operations subsequent to that illustrated in Fig. 11, including the transfer of the hollow parison to a finishing mold and the blowing of the hollow parison therein to final form may be effected substantially in the manner and by the means hereinbefore described.

It is to be understood that the application of the invention is not restricted to the production of hollow articles of the particular shapes and types shown in the accompanying drawings and herein described, or to the production of such articles by blowing methods, but that the invention and various features thereof may be modified and altered within a considerable range to meet the requirements of different service conditions and for different uses without departing from the spirit and scope of the invention as defined by the appended claims.

I claim:

1. In the manufacture of hollow glassware, the method which comprises delivering to an inverted mold having a neck portion at its lower end a charge of glass of sufficient size to fill the neck portion of the mold cavity and to extend in contact with the side walls of the mold cavity for the greater part of the length of the latter, applying air under pressure axially to the upper end of the glass in the mold without subjecting the entire upper end surface of such glass to said pressure so as to produce an axial cavity in the glass and to force glass of the charge upwardly into contact with the side walls of said mold cavity for the remainder of the length thereof, and thereafter introducing blowing pressure into the glass through the neck portion thereof to expand the glass in the mold and to blow out the walls of said cavity in the glass.

2. Glass forming apparatus comprising a mold, means for delivering a charge of molten glass to said mold, means for forming an initial blow aperture in the glass in one end portion of the mold, means for closing the opposite end of the glass holding cavity of the mold and for applying air under pressure locally to the central portion only of the end surface of the glass in the last-named end portion of the mold so as to produce an open-ended cavity in the latter and to displace glass in the direction opposite that in which said air under pressure is locally applied, said air applying means including a nozzle extending into the cavity of the mold, and means for thereafter applying blowing pressure to the glass through said initial blow aperture.

3. In the manufacture of hollow glassware, the method which comprises delivering to an inverted parison mold having a neck portion at its lower end a charge of glass of sufficient size to fill the neck portion of the mold cavity and to extend in contact with the side walls of the mold cavity for only part of the length of the latter, applying air under pressure axially to the upper end of the glass in the mold without subjecting the entire upper end surface of such glass to said pressure so as to produce an axial cavity in the glass and to force glass of the charge upwardly into contact with the side walls of said mold cavity for substantially the remainder of the length thereof, and thereafter introducing blowing pressure into the glass through the neck portion thereof to expand the glass in the mold and to blow out the walls of said cavity in the glass.

GEORGE E. ROWE.